United States Patent Office 2,824,240
Patented Feb. 18, 1958

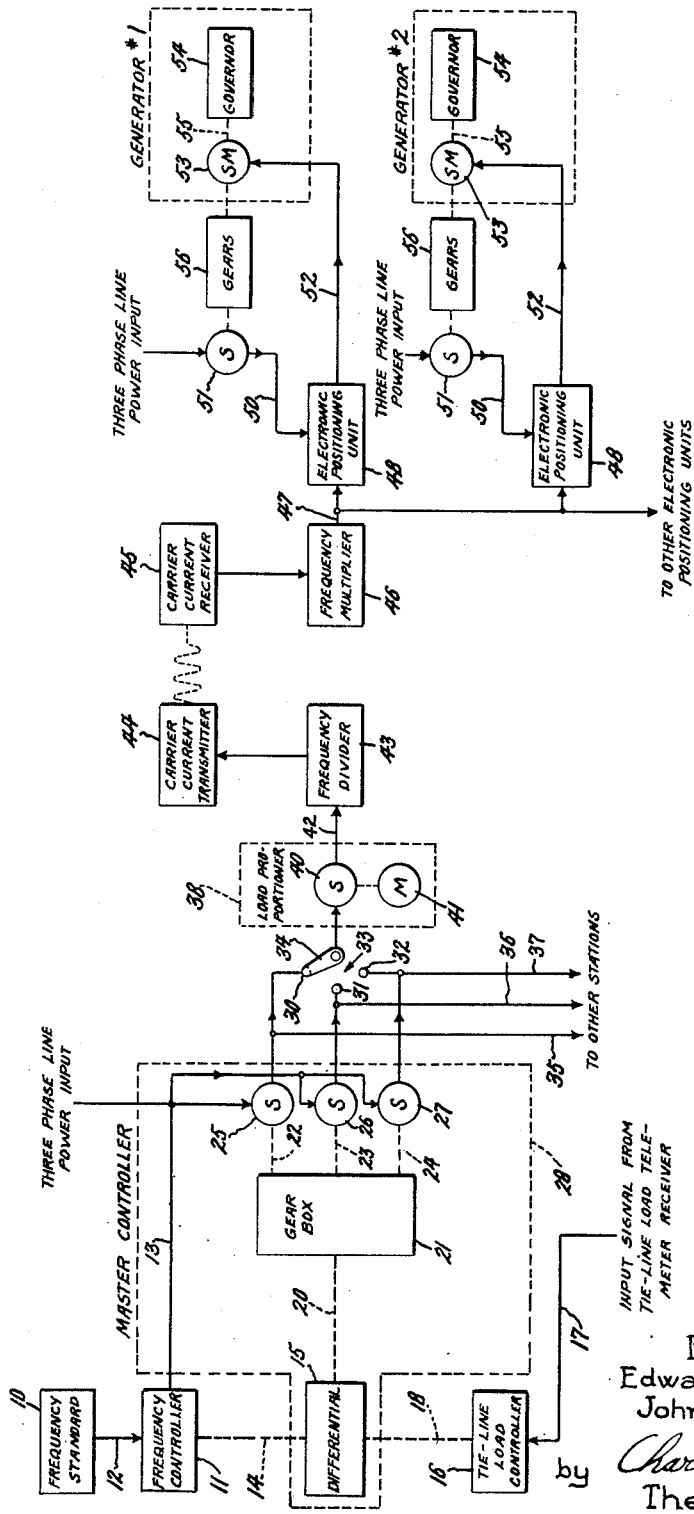

2,824,240

ELECTRIC POWER CONTROL SYSTEM

Edward E. Lynch, Wakefield, Mass., and John J. Larew, Scotia, N. Y., assignors to General Electric Company, a corporation of New York Application November 30, 1953, Serial No. 395,022

23 Claims. (Cl. 307—57)

This invention relates to an electric power control system, and more particularly to an apparatus for controlling the output of a power system which comprises a plurality of interconnected generators and generator stations, and which may be connected to other power systems by one or more tie lines in response to changes in load and frequency.

It is common practice for neighboring power systems to be interconnected by a tie line over which an interchange of power is made according to preselected schedules. It is necessary, of course, that the tie line interchange be held to the previously scheduled values, and the frequency must also be held at its desired value. Generally, each power system will include a plurality of generating stations, each of which will contain a plurality of generators.

As is well known, various generators and generating stations operate most efficiently at various percentages of their possible power output capacity. Therefore, any control system for controlling the power output of these generators or generator stations must permit manual or semi-automatic adjustment of the output to permit incremental loadings; that is, the output of each generator or station must be manually or semi-automatically adjustable for maximum economy.

The problem of controlling the power interchange between power systems and the frequency of the power generated has become known in the art as tie line load-frequency control, and various equipments have been proposed for automatic or semi-automatic load-frequency control. For the most part, the majority of the control equipment of these previously known systems was located in one generating station, and when control was extended to another station remote from the first, equipment substantially duplicating that at the first station was required. Such duplication is undesirable, both from the point of view of costly duplication of control equipment and from the point of view of accuracy, in that the frequency standards at the various stations might well be different.

It is a primary object of the present invention to obviate the above-mentioned problems and to provide an apparatus for controlling the operation of a plurality of generators and generating stations to hold tie line interchange to previously arranged schedules automatically, and simultaneously to hold the system frequency at a predetermined value, if desired.

Another object of the invention is to provide a system which will permit manual or semi-automatic adjustment of station or generator output to permit incremental loading for maximum economy.

Another object of the invention is to provide a system in which costly duplication of control equipment at each station is eliminated, and which is controlled from a central control or dispatching point that requires only one control signal channel from the central control station to each controlled generating station.

Another object is to provide a power control system which will effectively control the generation of a local power system, when the local system is not interconnected with a remote system.

Another object is to provide a tie line load-frequency control system which is not disabled when a generator or station ceases operation or starts operation, and in which, when such a situation occurs, the remaining generators or stations quickly vary their generation to retain the system output constant.

A further object of the invention is to provide a system which is as simple and inexpensive in cost and maintenance as is consistent with performance of the required functions.

The basic operation of a load-frequency control system can be shown by considering two areas, A and B, interconnected by a tie line and both having their own generation and loads. Economic and other considerations would dictate the most desirable load to send over the tie line, and this could be redetermined as often as required. Generally, the power interchange is rescheduled daily and readjusted at various times during each day. In addition to holding the tie line load to the prescheduled value, it is essential that the frequency of the generation in both areas be held at the desired value, which in present day operations is usually 60 cycles per second.

It is known that tie line load and frequency can both be held to the desired values by proper manipulation of the generator output at A and at B, in spite of load changes at either A or B. For example, assume that the condition exists wherein the loads at A and B and the scheduled tie line load are exactly supplied. Then, if a reduction in load occurs in area A, it results in an excess of generation at A over that required, which tends to increase both the frequency of generation and the tie line load from A to B. Similarly, an increase in load at A results in decreased frequency and decreased tie line power flow from A to B. However, when the load at B decreases, the frequency increases but the tie line load from A to B decreases. Similarly, when the load at B increases, the frequency decreases and the tie line load from A to B increases. Therefore, it is apparent that an increase in both frequency and tie line load, or a decrease in both frequency and tie line load, indicates a load change in area A. Similarly, when the frequency and tie line load change in opposite directions, it indicates a load change in area B. Therefore, by knowing both the change in frequency and change in tie line load, it can be determined whether the load has changed in area A or area B, and the proper adjustments can be made in the generation for these two areas. These facts indicate that for tie line load-frequency control, either automatic or manual, at least two primary detectors are required; one which detects frequency and one which detects load.

It is apparent that to restore the system to predetermined or scheduled conditions after the load changes in both areas, corrective action is required at both areas A and B. However, if area A properly increases or decreases its generation exactly to supply increases or decreases in load at A, then B will be required to take care of only its own load changes by corresponding generation changes at B, in order to hold both tie line load and frequency at desired values. The system of the present invention, is limited to corrective action in only one such area; that is, a system is required in area A to take care of changes in load and frequency in area A and another system is required in area B to take care of changes in load and frequency in area B. Thus, a control initiating signal which is a function of frequency divergence and tie line load divergence in a particular area, is required in order to accomplish this desired control automatically, with the system comprising the present invention.

A tie line load-frequency control system constructed in accordance with the invention may comprise essentially three parts—detector means, intermediate means, and end means. The detector means function to produce an error signal $\Delta f$, which is proportional to the deviation of the actual system frequency from a standard, and to produce an error signal $\Delta w$, which is proportional to the deviation of the actual tie line load from the scheduled load. These signals are then combined into a control signal $(k\Delta f + \Delta w)$, where $k$ is a proportioning constant, and this signal is coupled to the intermediate means.

The intermediate means includes means for selecting the maximum or a proportional part of the control signal and means for intentionally increasing or decreasing temporarily the magnitude of the selected component of the control signal in order to reapportion the load division between stations. The modified control signal may then be sent by conventional transmission means to the individual stations.

At each generating station, which includes the end means, the modified control signal is fed into an electronic positioning unit for each generator, which causes the governor synchronizing motor to turn and position the governor speed-level setting by a definite amount.

The proportioned frequency deviation signal $k\Delta f$ and the load deviation error signal $\Delta w$ are combined in the detector means in such manner that if the error is due to a change in load in area B, $k\Delta f$ and $\Delta w$ cancel each other and no change is made in generation in the stations of area A. If the change in load which causes the change in tie line load and frequency has occurred in area A, which is taken to be the area which is controlled by the system of the invention, a corrective signal is applied to the governors which is continuous and proportional to the deviation from schedule. Hence, it provides smooth controlling action of the prime mover output and involves a minimum of governor and prime mover maintenance. The corrective signal is transmitted simultaneously, instantly and accurately to all controlled generating units. Also, when using the control system of the invention, the addition of control to more stations or generators within a controlled area is relatively inexpensive, because the majority of the equipment is concentrated at a central control station, such as the load dispatcher's office, as part of the initial installation.

For a better understanding of the invention, reference is made to the following description taken in conjunction with the accompanying drawing, in which the single figure is a schematic block diagram of a tie line load-frequency control system constructed in accordance with the invention.

The power control system of the invention may be used to control the generation of a local power system, which is interconnected with one or more remote power systems by tie lines, in response to changes in the tie line load and frequency. Also, the control system may be made responsive to tie line load changes only or to system frequency changes only. However, for purposes of explanation, the more involved system which is responsive to both tie line load and frequency changes is illustrated and will be described hereafter.

The tie line load-frequency control system of the invention includes two primary detectors, one for detecting frequency deviation from the desired value, and one for detecting tie line load deviation from the previously arranged scheduled value. In the embodiment of the invention illustrated, the frequency deviation detector comprises a frequency standard 10 and a frequency controller 11. The frequency standard 10 may be of any conventional well-known type, such, for example, as an oscillator whose frequency is controlled by a tuning fork or by a crystal. The principal requirement of the frequency standard is that it be capable of producing an output of sufficient amplitude to drive the frequency controller 11, and that the output frequency $f_s$ be constant at the required value (usually 60 cycles per second) and accurate to the degree required by public utility power generation systems.

The output of the frequency standard 10 on line 12 is connected to one of the inputs of the frequency controller 11. Frequency controller 11 may consist of a servomechanism of any well-known conventional type which will function in the manner described. One servomechanism which is well-suited to the present use is illustrated and described in copending application Serial No. 395,119, filed of even date herewith by J. J. Larew and C. E. James, and assigned to the same assignee as the present invention. Reference is made to this copending application for a more detailed description of the circuitry and method of operation of the frequency controller 11. Briefly, however, frequency control 11 serves to compare the actual system frequency $f_a$ on line 13 with the standard frequency $f_s$ to produce rotation of an output shaft 14, whose speed of rotation is proportional to the difference $\Delta f$ between these two frequencies and which rotates in a direction determined by the polarity of the difference. The output shaft 14 is connected to one input of a conventional mechanical differential 15.

The tie line load deviation detector comprises a tie line load controller 16 having an input signal supplied thereto on line 17 which is from a conventional telemeter receiver or the like (not shown), which serves to provide a signal $w_a$ which is proportional to the actual tie line load. The tie line load controller 16 is essentially a servomechanism, which may be any one of various known designs. One servomechanism which is known to be suitable for this particular application is described in copending application Serial No. 395,117, filed of even date herewith by J. J. Larew and K. N. Burnett, and assigned to the same assignee as the present invention. Reference is made to that application for a complete description of the circuitry and operation of the servomechanism. It should be noted, however, that the controller serves to compare the signal $w_a$ from the telemeter receiver with another signal $w_s$, which is produced within the tie line load controller itself, and whose value can selectively be made proportional to the prearranged scheduled value of tie line load. After comparison of the two signals $w_a$ and $w_s$, the tie line load controller causes a shaft 18 to rotate at a speed which is proportional to the difference $\Delta w$ between the input signals $w_a$ and $w_s$, and in a direction determined by the polarity of the difference. The output shaft 18 is connected to the second input of differential 15.

The differential 15 serves to multiply the frequency deviation signal on shaft 14 by a proportionality constant $k$, whose purpose will be explained hereafter, and to add the tie line load deviation signal on shaft 18 to the proportioned frequency deviation signal. Therefore, the speed of rotation of differential output shaft 20 is proportional to the quantity $(k\Delta f + \Delta w)$.

The frequency controller 11 may be arranged to subtract the standard frequency $f_s$ from the actual system frequency $f_a$ or vice versa; similarly, the tie line load controller 16 may subtract the signal $w_s$, which is proportional to scheduled load from the signal $w_a$, which is proportional to actual tie line load, or vice versa. The only requirement is that the frequency controller 12, the tie line load controller 16 and the differential 15 function to produce a rotation of differential output shaft 20 when the actual system frequency and the actual tie line load both vary in the same direction from their respective standards. For example, if $f_a$ is greater than $f_s$ and $w_a$ is greater than $w_s$, and the frequency controller and load controller are so arranged that $\Delta f = f_a - f_s$ and $\Delta w = w_a - w_s$, then the differential must add the two deviation signals to produce a rotation of shaft 20 proportional to $(k\Delta f + \Delta w)$. Similarly, if $\Delta f = f_s - f_a$ and $\Delta w = w_s - w_a$, the differential must add $k\Delta f$ and $\Delta w$. However, if $\Delta f = f_a - f_s$ and $\Delta w = w_s - w_a$ or $\Delta f = f_s - f_a$ and $\Delta w = w_a - w_s$, the differential must be so arranged that it subtracts one signal from the other in order not to have $k\Delta f$ and $\Delta w$ tend to cancel each other when $f_a$ and $w_a$ are both greater or smaller than their respective standards $f_s$ and $w_s$. It is assumed for purposes of description that $\Delta f = f_a - f_s$ and $\Delta w = w_a - w_s$, and that the differential 15 adds the deviation signals to produce rotation of output shaft 20 whose speed is proportional to $(k\Delta f + \Delta w)$.

As was previously mentioned, a load change in the local area causes the tie line load and system frequency to vary in the same direction from their respective standards; thus $k\Delta f$ and $\Delta w$ will be arithmetically added in the differential. However, if the load changes in the remote area, the tie line load and system frequency vary in opposite directions from their respective standards. Because it is not desired to alter local generation in response to a load change in the remote area, the value of the constant $k$ is so determined that $k\Delta f$ and $\Delta w$ just cancel each other, when the remote area load changes. The value of $k$ may be easily determined by experimentation and the differential designed to provide it. Of course, a proportioning constant may be applied to $\Delta w$ rather than to $\Delta f$, if desired, and it will serve the same purpose as described above.

The output shaft 20 of differential 15, which is rotating at a speed which is proportional to $(k\Delta f + \Delta w)$ is connected to the input of a gear box 21, which has three output shafts designated 22, 23 and 24, respectively. The gear box 21 comprises a simple mechanical gear arrangement, so constructed that output shaft 22 rotates at the same speed as input shaft 20, output shaft 23 rotates at one-half the speed of input shaft 20, and output shaft 24 rotates at one-fifth the speed of input shaft 20. The shafts 22, 23 and 24 are connected to the rotors of differential selsyns 25, 26 and 27, respectively, which along with differential 15, gear box 21 and their associated shafts, comprise the master controller 28. The construction characteristics and method of operation of differential selsyns are well-known in the art, and need not be described in detail. It is believed sufficient to point out that, when the stator winding of a differential selsyn is energized by a three-phase voltage, the frequency of the three-phase voltage induced in the rotor winding is equal to the frequency of the voltage on the stator plus or minus the speed of rotation of the rotor. For example, if the stator winding is energized by a 60-cycle per second voltage and the rotor is turned at a speed of five cycles per second, the voltage induced in the rotor will have a frequency of either 55 cycles per second or 65 cycles per second, depending on the direction of rotation of the rotor. In the present case, the stator windings of selsyns 25, 26 and 27 are energized from the system power line having frequency $f_a$, and their rotors are rotated at speeds proportional to various fractions of the control signal $(k\Delta f + \Delta w)$. The outputs of the rotors of differential selsyns 25, 26 and 27 are connected to contacts 30, 31 and 32, respectively, of a selector switch 33, having a contact arm 34. Thus, the signal present on contact 30 will have a frequency equal to $f_a + (k\Delta f + \Delta w)$; the frequency of the signal on contact 31 will be equal to $f_a + (k\Delta f + \Delta w)/2$; and the frequency of the signal on contact 32 will be equal to $f_a + (k\Delta f + \Delta w)/5$.

It is to be understood, of course, that the gear ratio between the input shaft 20 and the output shafts 22, 23, and 24 of the gear box 21 are merely illustrative, and ratios other than 1:1, 2:1 and 5:1 may be used to provide whatever fractions of the control signal are desired. In addition, the gear box 21 may have any desired number of output shafts with a corresponding number of differential selsyns and selector switch contacts. It is now apparent that the selector switch 33, which has control signals of different amounts on its contacts, provides in effect a gain control for the tie line load-frequency control system. Such a gain control is necessary in order to permit all stations, even though any one of the stations might have generators whose maximum speeds of response vary from generators of other stations in the system, to operate from the same master control signal. The control system provides a selector switch for each controlled station, the switches being connected in parallel as indicated by the lines 35, 36 and 37. The output connections from the rotors of differential selsyns 25, 26 and 27 are each shown, for convenience sake, as a single line, but it is understood that the output of each of the rotors is a three-phase signal requiring three output connections. Similarly, selector switch 33 is merely representative of a selector switch capable of accommodating such connections.

Means are also provided in accordance with one of the objects of the invention to increase or decrease temporarily the frequency of the control signal to each station, in order to reapportion the load between the various stations of a network. In the present instance, such means consists of a load proportioner 38, which comprises a control transformer selsyn 40 and a reversible motor 41. The three-phase signal from contact arm 34 of selector switch 33 is connected to energize the stator winding of selsyn 40, and, if the rotor of the selsyn is fixed in position, the signal appearing on the single-phase rotor will have the same frequency as the signal which energizes the stator. However, as was previously pointed out, with reference to a differential selsyn, if the rotor is turned, the frequency of the signal appearing on the rotor will be increased or decreased from that signal which energizes the stator of the selsyn. In this case, a reversible motor 41 is connected to rotate the rotor of selsyn 40, from which the output is taken on line 42. Thus, the value of the control signal may be increased or decreased by a certain amount by causing the motor 41 to rotate the rotor of the selsyn 40. In this manner, continuous correction can be made to reallocate generation between the various stations. The reversible motor 41 may be energized by manually closing a switch (not shown), or means may be provided for automatically energizing the motor when the output of the station concerned does not bear the proper proportion to the system load. Such means might comprise a recording wattmeter of well-known type, which has movable upper and lower limit contacts thereon.

The control signal, which is present on the output connection 42 from the rotor of control transformer selsyn 40, is connected to the input of a conventional frequency divider 43 of a type well-known in the art. The frequency divider serves to reduce the frequency of the approximately 60-cycle control signal in order to make it more suitable for modren types of narrow band carrier current and audio frequency transmission. The reduced frequency control signal is connected from the output of frequency divider 43 to the input of a carrier current transmitter 44. It is pointed out that the tie line load-frequency control signal need not necessarily be transmitted from the central station to the individual generating stations by means of carrier current transmission, but such means are readily adaptable to this application. A suitable control signal transmitting system is shown and described in copending application S. N. 394,408, filed November 25, 1953, by E. E. Lynch and G. S. Lunge, and assigned to the same assignee as the present invention.

It is understood, of course, that the equipment thus far described, which would be located in the central control office, would include a selector switch 33, a load proportioner 38, a frequency divider 43 and a transmitter 44 for each controlled station within the system. Similarly, those elements of the control system which will be described hereafter are to be found in each of the controlled stations, although only one such installation will be described in detail.

At the station to which the tie line load-frequency control signal is sent, it is received by a suitable device for receiving and utilizing the transmitted intelligence. In the present case, the device may be a carrier current receiver 45 having its output connected to a frequency multiplier 46, which serves to return the control signal to its approximate 60-cycle frequency. Thus, the signal appearing on the output connection 47 of the frequency multiplier has a frequency equal to $f_a+(k\Delta f+\Delta w)$ when the movable arm 34 of selector switch 33 is set on contact 30, and assuming the load proportioner 38 is not being actuated.

The control signal appearing on line 47 is connected to one of the inputs of each of a plurality of electronic positioning units 48. There is an electronic positioning unit 48 provided for each of the generators comprising the station, and, although only two positioning units are shown, it is understood that the control signal may also be connected into other such units. The function of each of the electronic positioning units 48 is to compare the phases (or frequencies) of two input signals and, if they do not agree, to provide an output, which may be used to actuate other devices. The control system of the invention is not limited to the use of any one particular device of this type, but one such device which is known to be suitable for this purpose is described in copending application S. N. 395,118 filed of even date herewith by J. J. Larew, and assigned to the same assignee as the present invention. As previously mentioned, one of the inputs to each electronic positioning unit 48 is from line 47, which is the single-phase control signal having, in the illustrated case, a frequency equal to $f_a+(k\Delta f+\Delta w)$. The second input to each electronic positioning unit is from a line 50, which is connected to the rotor of a control transformer selsyn 51, whose three-phase stator winding is energized by the system line power having frequency $f_a$. It is apparent from the previous description of the method of operation of a control transformer selsyn that if the rotor of selsyn 51 is not rotating, the induced voltage appearing across the rotor will be of the same frequency $f_a$ as the voltage which energizes the stator windings. The electronic positioning unit 48 serves to compare the frequencies (or phases) of the control signal on line 47 and the selsyn rotor signal on line 50, and, if there is a difference, power is supplied through connection 52 to a reversible synchronizing motor 53, which changes the speed-level setting of a governor 54 of the associated generator through rotation of shaft 55. In the servo amplifier of the copending application S. N. 395,118 referred to above, if the frequency of the control signal is greater than that of the signal derived from selsyn 51, a relay may be actuated whose contacts are connected to supply power to synchronizing motor 53 to cause it to turn in one direction, and if the control signal has a frequency less than that derived from selsyn 51, another relay may be energized whose contacts are connected to supply power to synchronizing motor 53 and cause it to turn in the opposite direction. In addition, that particular servo amplifier embodies a "dead-band" adjustment, which functions to make the circuit insensitive to small, rapid fluctuations in the control signal, and provides stability to the control system. The output shaft of synchronizing motor 53 is also connected through a gear box 56 to the rotor of control transformer selsyn 51, so that as synchronizing motor 53 rotates to change the speed-level setting of governor 54, it also rotates the rotor of selsyn 51, thus changing the frequency of the signal connected to the input of electronic positioning unit 48 through connection 50. When the frequency or phase of the signal connected to the input of electronic positioning unit 48 through connection 50 is the same as that of the control signal connected through line 47, the output of the positioning unit ceases, and synchronizing motor 53 no longer turns. Thus, the synchronizing motor 53 has turned by an amount proportional to $(k\Delta f+\Delta w)$ and the governor speed-level setting is changed by a definite amount in response to the control signal.

Because the synchronizing motors turn a relatively high speed, it is necessary that reduction gears in gear box 56 be interposed between each synchronizing motor 53 and the rotor of the corresponding selsyn 51. In addition, the gears in gear box 56 provide means for altering the division of load changes between generators. For example, one generator might be in such condition that it could respond easily to the changes in load required by the control signal, while the second generator might not be capable of responding as quickly. Therefore, the gears in gear box 56 associated with the first generator could have a higher step-down ratio than the gears in the gear box associated with the second generator, thus allowing the first generator to absorb more of the change in load than the second generator.

Let us now consider the operation of the tie line load-frequency control system in response to load changes in the local area, which is controlled by the system, and in the remote area to which the local area system is connected by a tie line. For purposes of explanation, it will be assumed that the changes in load occur at either the local area or the remote area, but the complex situation in which load changes occur simultaneously in both areas will not be considered. It is pointed out, however, that in the more complicated situation the operation of the control system is basically the same as in the simple situation involving only one load change, and, if the control system of the invention is installed in both the local and the remote areas, the system will be quickly restored to normal, even in the case where the loads at the local and remote areas change simultaneously in varying proportions.

First, consider the case in which the load in the local area decreases, thus resulting in an excess of generation in this area. It is apparent that in this case the frequency of generation will increase, and the power transmitted over the tie line from the local area to the remote area will also increase. Thus, when the line frequency $f_a$ is compared with the standard frequency $f_s$ in the frequency controller 12, the output shaft 14 will rotate at a speed proportional to the difference $\Delta f$, where $\Delta f$ is defined as $(f_a-f_s)$. As was previously mentioned, the tie line load also increases, and thus the signal $w_a$ from the telemeter receiver which is proportional to actual tie line load, is larger than the signal $w_s$ produced within the tie line load controller, which is proportional to scheduled tie line load. Thus, there will be a rotation of the output shaft 18 of the tie line load controller at a speed which is proportional to the error $\Delta w$, where $\Delta w$ is defined as $(w_a-w_s)$. Because the rotation of shaft 14, which is proportional to $\Delta f$, and the rotation of shaft 18, which is proportional to $\Delta w$, are both in the same direction, they are added in differential 15 and its output shaft 20 rotates at a speed which is proportional to $(k\Delta f+\Delta w)$.

This shaft rotation is coupled through gear box 21 to the rotors of differential selsyns 25, 26 and 27, whose stator windings are energized by the three-phase power line having a frequency $f_a$. Thus, the frequency of the control signals connected to contacts 30, 31 and 32 of selector switch 33 equal the line frequency $f_a$ plus the various fractions of the master control signal frequency $(k\Delta f+\Delta w)$ previously mentioned. In the present case, the arm 34 of the selector switch is set on contact 30, and so the entire control signal is used to energize the stator windings of control transformer selsyn 40. If it is desired not to add to or subtract from this control signal, motor 41 is not energized, and a signal of the same frequency $f_a+(k\Delta f+\Delta w)$ is taken from the rotor of selsyn 40 and connected into frequency divider 43. If it should be desirable for operating reasons to add to or subtract from the control signal, motor 41 may be energized to turn the rotor of selsyn 40 in the proper direction to increase or decrease the frequency of the control signal sent to the frequency divider. In the frequency divider 43, the frequency of the control signal is reduced, and the signal is sent to carrier current transmitter 44. This signal is transmitted to the station where it is received by carrier current receiver 45, and its frequency restored to approximately 60 cycles per second by frequency multiplier 46.

The control signal $f_a+(k\Delta f+\Delta w)$ is connected from frequency multiplier 46 to an electronic positioning unit 48, which compares the frequency of the control signal with the frequency of the signal connected into the unit on line 50 from the rotor of a control transformer selsyn 51, whose stator windings are energized by the system voltage having frequency $f_a$. If the frequencies or phases of the two input signals do not agree, the output of the electronic positioning unit 48 energizes synchronizing motor 53 and causes it to turn in a direction which so positions the rotor of selsyn 51 that the rotor signal agrees in phase or frequency with the incoming control signal. Simultaneously, synchronizing motor 53 positions the speed-level setting of governor 54 by a definite amount, which is proportional to the integral with respect to time of the control signal $(k\Delta f+\Delta w)$.

The control signal from frequency multiplier 46 is simultaneously coupled into an electronic positioning unit 48 for each generator. Thus, the speed-level settings of each generator governor 54 are simultaneously adjusted, although not necessarily by the same amounts, because the ratio of the gears in gear box 56 may be different for different generators, as dictated by operating considerations.

It is pointed out that the entire control signal derived from selsyn 25, or a portion thereof, as derived from selsyns 26 and 27, is sent simultaneously to each controlled station within the network. Of course, the central control station contains a selector switch 33, a load proportioner 38, a frequency divider 43, and a carrier current transmitter 44 for each station, and each controlled station must contain a carrier current receiver 45, a frequency multiplier 46 and the controlling equipment for each controlled generator within the station. One of the outstanding features and advantages of the invention is the fact that only one frequency standard 10, one frequency controller 12, one tie line load controller 16 and one master controller 28 are required for the entire system. Thus, every station of the network may be controlled by the same master control signal, and there can be no error introduced into the system because of different standards at the various stations.

As a further example of the operation of the control system, consider the case in which the load in the local area increases, thus causing a decrease in the frequency of the system and a decrease in the tie line load. In this instance, the operation of the various components of the system would be like that previously described for the case when the load in the local area decreased, except that the rotations of the various shafts and, hence, the frequency of the control signal would be opposite to that previously described. For example, the frequency deviation and the tie line load deviation would both be negative. Thus, the rotation of input shafts 14 and 18 to differential 15 are in the reverse direction from that previously described, hence the output of the differential on shaft 20 is likewise reversed, and the frequency of the signal $f_a+(-k\Delta f-\Delta w)$ derived from selsyns 25, 26 and 27 would be less than the frequency of the system $f_a$. At each individual station, the electronic positioning units would cause the synchronizing motors of the generators to turn in a direction to increase the generation, rather than to decrease it, as was the case in the first example considered.

A different situation arises when the load in the remote area changes. For example, if the load in the remote area decreases, the system frequency tends to increase and the power flow over the tie line from the local area to the remote area decreases. Therefore, the system frequency $f_a$ is greater than the standard frequency $f_s$, and the frequency deviation $\Delta f$ is positive. In this case, the tie line load decreases, and thus the actual tie line load $w_a$ is less than the scheduled tie line load $w_s$, and the load deviation $\Delta w$ is negative. This causes the input shafts 14 and 18 to differential 15 to rotate in opposite directions, and, therefore, there is no rotation of output shaft 20 of the differential. The signal sent to the stations is a signal having the system frequency $f_a$, and, because the two signals connected to the electronic positioning units are the same, there is no output and the synchronizing motors of the generators are not caused to turn. Thus, it is apparent that the tie line load-frequency control system of the invention functions to control the generation only in response to changes in load in the local area in which the system is installed, and is insensitive to load changes in the remote area, which also tend to change the system frequency and tie line load. It is again pointed out the proportionality constant $k$, by which $\Delta f$ is multiplied in the differential 15, is so adjusted that $k\Delta f$ and $\Delta w$ just cancel each other, when the change in tie line load and system frequency is entirely caused by a load change in the remote area.

As a final example, consider the situation when the load in the remote area increases, thus tending to decrease the system frequency, and increase the power flow from the local to the remote area. In this case, the frequency deviation $\Delta f$ is negative, and the tie line load deviation $\Delta w$ is positive. Thus, it is apparent that once again the inputs to differential 15 are opposite and thus cancel each other, and the control signal received by each of the stations will again be the system frequency $f_a$, which initiates no change in the speed-level setting of the governors of the generators.

The consideration of the last two examples above brings out another of the outstanding advantages of the invention. It was noted that although the control signal was such as to cause no change in the speed-level settings of the generator governors, nevertheless the control signal was present. Thus, the control signal may be continuously monitored to insure that it is present, even though the corrective portion of the control signal may be zero.

If the control system is to be used to control the generation of a local power system, which is operating independently and is not connected by a tie line to a remote power system, the tie line load controller 16 and the differential 20 may be dispensed with, and the output shaft 14 of the frequency controller 11 connected directly to the input of gear box 21. In this case, any load changes in the independent local area will cause a change in system frequency, which will cause the power system to vary its generation to return the system frequency to its standard value, and thus cause the generation output to match the system load.

In some interconnected power systems, it is customary for one system to vary its generation to maintain only the tie line load at its prescheduled value and to ignore system frequency changes. In this case, the frequency standard 10, frequency controller 11 and differential 15 may be eliminated, and the output shaft 18 of the tie line load controller 16 connected directly to the input of the gear box 21. The frequency of the control signal will be dependent only on the tie line load deviation, and the generation of the local system adjusted only to maintain the tie line load at its prescheduled value without regard for system frequency.

It is now apparent that the invention fulfills the objects set forth above, and provides an excellent solution to the troublesome problem of tie line load-frequency control. The corrective signal sent to the generator governors is continuous and proportional to the deviation of tie line load and frequency from schedule, and thus it provides smooth controlling action of the prime mover output. In addition, the corrective signal is transmitted simultaneously, instantly, and accurately to all of the controlled generating units of the network, and the addition of more stations to the network is relatively inexpensive, because the majority of the equipment is concentrated at a central control office. The controlling factor of the signal sent from the central office to each of the generating stations is its frequency, and the two signals representing the frequency deviation and the load deviation are combined into a single signal, which may be modified in the load proportioner to permit incremental loading, and sent over separate channels to their respective controlled stations. The system is easily applicable to the control of either hydro or steam generating units, and the gears between the synchronizing motors and the positioning selsyns may be adjusted for the different types of generating units.

Also, it is apparent that control of the individual generator units is independent of the characteristics of the synchronizing motors. This is so because there is feedback from each synchronizing motor 53 through the control transformer 51, so that each motor is individually controlled.

It is apparent that stations or generators may be added to or subtracted from the controlled system without upsetting the control, and after such change the system will quickly return to its proper generation output. In addition, the control system of the invention is compatible with existing systems, which may be used in interconnected areas, because the control exercised by the system of the invention is as fast or faster than that of existing systems. If the present control system is used in conjunction with a slower responding control system, the response of the present system may be slowed down to match that of the other system or systems.

It is pointed out that the present system is not limited to controlling tie line load and frequency between only two interconnected areas, but may easily be modified to be responsive to changes in several tie lines, which may interconnect the local area and several remote areas.

It is apparent that many changes and modifications may be made by one skilled in the art without departing from the spirit of the invention, and it is intended to be limited only by the scope of the appended claims.

What we claim as new and desire to protect by Letters Patent of the United States is:

1. An electric power control system for controlling the generation of a power system comprising means for producing a frequency deviation signal proportional to the difference between the system frequency and a standard frequency, means for producing a control signal whose frequency varies from said system frequency in accordance with the amplitude and polarity of said frequency deviation signal, means for comparing said control signal frequency and said system frequency to produce an output proportional to the difference therebetween, and means for varying the generation of said power system in response to said output to tend to maintain said system frequency at its standard value.

2. An electric power control system for controlling the generation of a power system having a plurality of generating stations, the control system comprising means for producing a frequency deviation signal proportional to the difference between the system frequency and a standard frequency, means connected to receive said frequency deviation signal for producing a control signal whose frequency varies from said system frequency in accordance with the amplitude and polarity of said frequency deviation signal, means for each said generating station connected to receive said control signal for comparing the frequency of said control signal with said system frequency to produce an output proportional to the difference therebetween, and means connected to receive said output for varying the generation of each said generating station in response to the output of the corresponding comparison means for maintaining said system frequency at its standard value.

3. An electric power control system for controlling the generation of a power system having a plurality of generating stations and a plurality of generators in each generating station, the control system comprising means for producing a frequency deviation signal proportional to the difference between the system frequency and a standard frequency, means for selecting a proportionate amount of said frequency deviation signal and producing a control signal for each generating station whose frequency varies from said system frequency in accordance with the amplitude and polarity of said selected proportionate amount of said frequency deviation signal, means for varying the frequency of said control signal to produce a modified control signal for each generating station, means for comparing the frequency of said modified control signal with said system frequency to produce an output for each generator which is proportional to the difference therebetween, and means for varying the generation of each corresponding generator in response to the respective output supplied to such means to maintain said system frequency at its standard value.

4. An electric power control system for controlling the generation of a power system comprising means for producing a load deviation signal proportional to the difference between the actual load and a prescheduled load on tie line means interconnecting said power system, means for producing a control signal whose frequency varies with the amplitude and polarity of said load deviation signal, and means for varying the generation of said power system in response to said control signal to tend to maintain said tie line load at its prescheduled value.

5. An electric power control system for controlling the generation of a power system comprising means for producing a load deviation signal proportional to the difference between the actual load and a prescheduled load on tie line means interconnecting said power system, means connected to receive said load deviation signal for producing a control signal whose frequency varies from said system frequency in accordance with the amplitude and polarity of said load deviation signal, means connected to receive said control signal for comparing said control frequency and said system frequency to produce an output proportional to the difference therebetween, and means for varying the generation of said power system in response to said output to tend to maintain said system frequency at its standard value.

6. An electric power control system for controlling the generation of a power system having a plurality of generating stations, the control system comprising means for producing a load deviation signal proportional to the difference between the actual load and a prescheduled load on tie line means interconnecting said power system, means for producing a control signal whose frequency varies from said system frequency in accordance with the amplitude and polarity of said load deviation signal, means for comparing said control signal frequency and said system frequency to produce an output for each generating station which is proportional to the difference therebetween, and means for varying the generation of each generating station in response to the output of the corresponding comparison means to tend to maintain said system frequency at its standard value.

7. An electric power control system for controlling the generation of a power system having a plurality of generating stations and a plurality of generators in each generating station, the control system comprising means for producing a load deviation signal proportional to the difference between the actual load and a prescheduled load on tie line means interconnecting said power system, means for selecting a proportionate amount of said load deviation signal and producing a control signal for each generating station whose frequency varies from said system frequency in accordance with the amplitude and polarity of said selected proportionate amount of said load deviation signal, means for varying the frequency of said control signal to produce a modified control signal for each station, means for comparing the frequency of said modified control signal with said system frequency to produce an output for each generator which is proportional to the difference therebetween, and means for varying the generation of each corresponding generator in response to the output supplied to such means to tend to maintain said tie line load at its prescheduled value.

8. An electric power control system for controlling the generation of a power system comprising means for comparing the system frequency and a standard frequency for producing a frequency deviation signal proportional to the difference therebetween, means for producing a load deviation signal proportional to the difference between the actual load and a prescheduled load on tie line means interconnecting said power system, means for combining said frequency deviation signal and said load deviation signal and producing a control signal, and means for varying the generation of said power system in response to said control signal to tend to maintain said system frequency at its standard value and said tie line load at its prescheduled value.

9. An electric power control system for controlling the generation of a power system comprising means for producing a frequency deviation signal proportional to the difference between the system frequency and a standard frequency, means for producing a load deviation signal proportional to the difference between the actual load and a prescheduled load on tie line means interconnecting said power system, means for combining said frequency deviation signal and said load deviation signal and producing a control signal whose frequency varies with the amplitude and polarity of the combined deviation signals, and means for varying the generation of said power system in response to the frequency of said control signal to tend to maintain said system frequency at its standard value and said tie line load at its prescheduled value.

10. An electric power control system for controlling the generation of a power system comprising means for producing a frequency deviation signal proportional to the difference between the system frequency and a standard frequency, means for producing a load deviation signal proportional to the difference between the actual load and a prescheduled load on tie line means interconnecting said power system, means connected to receive said frequency deviation signal and said load deviation signal for combining said frequency deviation signal and said load deviation signal and producing a control signal whose frequency varies from said system frequency in accordance with the amplitude and polarity of the combined deviation signals, and means connected to receive said control signal for varying the generation of said power system in response to the difference between said control signal frequency and said system frequency to tend to maintain said system frequency at its standard value and said tie line load at its prescheduled value.

11. An electric power control system for controlling the generation of a power system comprising means for producing a frequency deviation signal proportional to the difference between the system frequency and a standard frequency, means for producing a load deviation signal proportional to the difference between the actual load and a prescheduled load on tie line means interconnecting said power system, means for combining said frequency deviation signal and said load deviation signal and producing a control signal whose frequency varies from said system frequency in accordance with the amplitude and polarity of the combined deviation signals, means for comparing said control signal frequency and said system frequency to produce an output proportional to the difference therebetween, and means for varying the generation of said power system in response to said output to tend to maintain said system frequency at its standard value and said tie line load at its prescheduled value.

12. An electric power control system for controlling the generation of a power system having a plurality of generating stations and a plurality of generators in each generating station, the control system comprising means for producing a frequency deviation signal proportional to the difference between the system frequency and a standard frequency, means for producing a load deviation signal proportional to the difference between the actual load and a prescheduled load on tie line means interconnecting said power system, means for combining said frequency deviation signal and said load deviation signal, means for selecting a proportionate amount of the combined frequency deviation and load deviation signals and producing a control signal for each generating station whose frequency varies from said system frequency in accordance with said selected proportionate amount of said combined signals, means for varying the frequency of said control signal to produce a modified control signal for each station, means for comparing the frequency of said modified control signal with said system frequency to produce an output for each generator which is proportional to the difference therebetween, and means for varying the generation of each corresponding generator in response to the output supplied thereto to tend to maintain said system frequency at its standard value and said tie line load at its prescheduled value.

13. An electric power control system for controlling the generation of a power system comprising means for comparing the system frequency with a standard frequency to produce rotation of a first shaft at a speed proportional to the difference therebetween, means for comparing a signal proportional to the actual load on tie line means interconnecting said power system with a signal proportional to a prescheduled load thereon to produce rotation of a second shaft at a speed proportional to the difference between said signals, a mechanical differential connected to said first and second shafts for producing rotation of a third shaft at a speed proportional to the algebraic sum of the speeds of rotation of said first and second shafts, means for rotating a fourth shaft at a speed proportionate to the speed of rotation of said third shaft, means for producing an electrical control signal whose frequency varies from said system frequency in accordance with the speed and direction of rotation of said fourth shaft, means for varying the frequency of the control signal to produce a modified control signal, means for comparing said modified control signal frequency and said system frequency to produce an output proportional to the difference therebetween, and means for varying the generation of said power system in response to said output to tend to maintain said system frequency at its standard value and said tie line load at its prescheduled value.

14. An electric power control system for controlling the generation of a power system comprising means for producing a frequency deviation signal proportional to the difference between the system frequency and a standard frequency, means for producing a load deviation signal proportional to the difference between the actual load and a prescheduled value of load on tie line means interconnecting said power system, means for combining said frequency deviation signal and said load deviation signal to produce a control signal whose frequency varies with amplitude and polarity of said deviation signals, manually actuated means for varying the frequency of said control signal to produce a modified control signal, and means responsive to said modified control signal for varying the generation of said power system to tend to maintain said system frequency at its standard value and said tie line load at its prescheduled value.

15. An electric power control system for controlling the generation of a power system comprising means for producing a frequency deviation signal proportional to the difference between the system frequency and a frequency standard, means for producing a load deviation signal proportional to the difference between the actual power flow from said power system and a prescheduled value of power flow from said power system on tie line means interconnecting said power system, means for combining said frequency deviation signal and said load deviation signal in a manner to tend to cancel each other when the system frequency and tie line power flow vary from their respective standards in opposite directions, means for producing a control signal whose frequency varies from said system frequency in accordance with the amplitude and polarity of the combined frequency deviation and load deviation signals, means for comparing the control signal frequency and said system frequency to produce an output proportional to the difference therebetween, and means responsive to said output for varying the generation of said power system to tend to maintain said system frequency at its standard value and said tie line load at its prescheduled value.

16. An electric power control system for controlling the generation of a power system comprising means for producing an error signal proportional to the difference between a condition of said system and a desired condition of said system, means for producing a control signal whose frequency varies from the system frequency in accordance with the amplitude and polarity of said error signal, and means for varying the generation of said power system in response to the difference between the control signal frequency and said system frequency to tend to bring said system condition to said desired condition.

17. An electric power control system for controlling the generation of a power system having a plurality of generating stations, the control system comprising means for producing an error signal proportional to the difference between a condition of said system and a desired condition of said system, means for producing a control signal whose frequency varies from said system frequency in accordance with the amplitude and polarity of said error signal, means for each said generating station for comparing said control signal frequency and said system frequency to produce an output proportional to the difference therebetween, and means connected to receive said output for varying the generation of each said generating station in response to the output of the corresponding comparison means to tend to bring said system condition to said desired condition.

18. An electric power control system for controlling the generation of a power system having a plurality of generating stations, the control system comprising means for producing an error signal proportional to the difference between a system condition and a desired condition, means for selecting a proportionate amount of said error signal and producing a control signal for each generating station whose frequency varies in accordance with the amplitude and polarity of said selected proportionate amount of said error signal, and means for varying the generation of each generating station in response to the corresponding control signal to tend to bring said system condition to said desired condition.

19. An electric power control system for controlling the generation of a power system having a plurality of generating stations, the control system comprising means for producing an error signal proportional to the difference between a system condition and a desired condition, means for producing a control signal for each generating station whose frequency varies with the amplitude and polarity of said error signal, means for varying the frequency of at least one said control signal to produce a modified control signal for at least one said generating station, and means for varying the generation of each generating station in response to its respective control signal to tend to bring said system condition to said desired condition.

20. An electric power control system for controlling the generation of a power system having a plurality of generating stations, the control system comprising means for producing an error signal proportional to the difference between a system condition and a desired condition, means for selecting a proportionate amount of said error signal and producing a control signal for each generating station whose frequency varies in accordance with the amplitude and polarity of said selected proportionate amount of said error signal, means for varying the frequency of at least one said control signal to produce a modified control signal for at least one said generating station, and means for varying the generation of each generating station in response to its respective control signal to tend to bring said system condition to said desired condition.

21. An electric power control system for controlling the generation of a power system comprising means for producing an error signal proportional to the difference between an actual power output and a desired power output in said system, means for producing a control signal whose frequency varies in accordance with the amplitude and polarity of said error signal, and means for varying the generation of said power system in response to said control signal to tend to bring said power output to said desired power output.

22. An electric power control system for controlling the generation of a power system having a plurality of generating stations and a plurality of generators in each generating station, the control system comprising means for producing an error signal proportional to the difference between a system condition and a desired condition, means for selecting a proportionate amount of said error signal and producing a control signal for each generating station whose frequency varies in accordance with the amplitude and polarity of said selected proportionate amount of said error signal, means for varying the frequency of at least one said control signal to produce a modified control signal for at least one generating station, means for each generator for comparing the frequency of the corresponding control signal with said system frequency to produce an output which is proportional to the difference therebetween, and means for varying the generation of each corresponding generator in response to the respective output supplied to such means to tend to bring said system condition to said desired condition.

23. An electric power control system for controlling the generation of a power system comprising means for producing a frequency deviation signal proportional to the difference between the system frequency and a frequency standard, means for producing a load deviation signal proportional to the difference between the actual power flow from said power system and a prescheduled value of power flow from said power system on tie line means interconnecting said power system, means for producing a control signal whose frequency varies in accordance with said frequency deviation signal and said load deviation signal by combining said frequency deviation signal and said load deviation signal in a manner to tend to cancel each other when the system frequency and tie line power flow vary from their respective standards in opposite directions, and means for varying the generation of said power system in response to said control signal to tend to maintain said system frequency at its standard value and said tie line load at its prescheduled value.

References Cited in the file of this patent

UNITED STATES PATENTS 2,399,421   Artzt _____ Apr. 30, 1946